United States Patent
Ray et al.

(10) Patent No.: US 8,054,186 B1
(45) Date of Patent: Nov. 8, 2011

(54) ANIMAL REPELLENT APPARATUS

(76) Inventors: Benjamin R. Ray, Royston, GA (US);
Sue B. Ray, Royston, GA (US)

(*) Notice: Subject to any disclaimer, the term of this patent is extended or adjusted under 35 U.S.C. 154(b) by 328 days.

(21) Appl. No.: 12/401,019

(22) Filed: Mar. 10, 2009

(51) Int. Cl.
 *G08B 23/00* (2006.01)
(52) U.S. Cl. .................. 340/573.2; 340/933; 340/693.5
(58) Field of Classification Search ............... 340/573.2, 340/933, 693.5, 693.9, 905
 See application file for complete search history.

(56) References Cited

U.S. PATENT DOCUMENTS

| | | | |
|---|---|---|---|
| D339,080 S | 9/1993 | Gartlacher | |
| 5,320,446 A | 6/1994 | Strieter | |
| 5,939,987 A | 8/1999 | Cram | |
| 6,615,770 B2 | 9/2003 | Patterson et al. | |
| 7,113,098 B1 * | 9/2006 | Hayes | 340/573.2 |
| 2002/0149493 A1 | 10/2002 | Yudate et al. | |

* cited by examiner

*Primary Examiner* — Travis Hunnings
(74) *Attorney, Agent, or Firm* — Crossley Patent Law; Mark A. Crossley

(57) ABSTRACT

The animal repellent apparatus provides a safety reflector with a solar powered ultrasonic signal audible to deer and other animals. The apparatus is used in place of currently existing reflectors and is of like shape and size. The ultrasonic signal is repulsive to such animals and thereby wards them away from roads that use the apparatus. The low profile, impact resistant apparatus has a reflector on each side for visibility to motorists in either direction of traffic flow. While differing little from typical reflectors in outward appearance, the apparatus is internally equipped with a rechargeable battery, protected solar panel, and a sound chip for emitting the ultrasonic signal. Since the apparatus requires no patterned deployment, installation is straightforward and requires no measured or other particular arrangement. The apparatus can be installed sequentially, or sporadically.

2 Claims, 3 Drawing Sheets

ANIMAL REPELLENT APPARATUS

BACKGROUND OF THE INVENTION

Audio animal deterrence devices have been widely used in the past few decades, often in an around homes, for example. It is well understood that deterring animals from roadways is of utmost importance. Animal/vehicle collisions are extremely frequent along and in some roadways. Damage to vehicles, injuries and deaths to humans, and animal deaths occur far too often. To that end, various animal deterrents have been proposed for roadway use. Some use light displays. Some use a series of devices, each placed on adjacent fence posts or pattern-deployed, for example. At least one such device has proposed the use of sound. Several significant problems exist with most such devices—affordability, deployment, and durability among those problems. Any devices employing receivers and transmitters require circuitry that decreases reliability and increases cost. Propagation of such devices is therefore often impractical.

Typically required service and replacement of such devices is further prohibitive, as roadway repair work of any kind impedes or fully halts traffic, and incurs additional costs. And, patterned deployment of such devices increases cost and difficulty in their installation and service. What has been needed is an animal repellent apparatus that closely resembles typical currently used reflectors. The apparatus should require substantially no service throughout a lifespan of many years. The apparatus should avoid all but the most basic circuits. The apparatus should be internally designed and packaged to mimic the outward appearance and size of current typically used reflectors. The apparatus should be effective whether deployed randomly or otherwise. The present apparatus fulfills these needs.

FIELD OF THE INVENTION

The animal repellent apparatus relates to animal deterrence devices and more especially to an animal repellent apparatus that automatically recharges its internal battery that powers an internal transducer in emitting an ultrasound signal in deterring animal incursion onto roadways.

SUMMARY OF THE INVENTION

The general purpose of the animal repellent apparatus, described subsequently in greater detail, is to provide a animal repellent apparatus which has many novel features that result in an improved animal repellent apparatus which is not anticipated, rendered obvious, suggested, or even implied by prior art, either alone or in combination thereof.

To attain this, the animal repellent apparatus provides a safety reflector with a solar powered ultrasonic signal audible to deer and other animals. The apparatus is used in place of currently existing reflectors and is of like shape and size. The ultrasonic signal is repulsive to such animals and thereby wards them away from roads that use the apparatus. The ultrasonic signal is beyond the hearing range of humans. The low profile, impact resistant apparatus has a reflector on each side for visibility to motorists in either direction of traffic flow. While differing little from typical reflectors in outward appearance, the apparatus is internally equipped with a rechargeable battery, protected solar panel, and a sound chip alarm for emitting the ultrasonic signal. The solar panel located within the top of the apparatus charges the internal battery that powers the signal at night.

Since the apparatus requires no patterned deployment, installation is straightforward and requires no measured or other particular arrangement. The apparatus can be installed sequentially, or sporadically.

For example, in an area of comparatively lessened animal roadway incursion, typical reflectors might be inter-dispersed between each apparatus installed, thereby saving significantly on animal deterrence expenses.

The apparatus is provided in a basic embodiment, with only basic circuitry that puts the battery in direct contact with the alarm. The apparatus is also available with more complex circuitry, although still relatively basic, that places a microprocessor chip and a sensor in the circuit. More than one type of sensor is available. One sensor senses nearby motion of animals to trigger alarm. Another sensor senses absence of light, so that night function of the alarm is only provided. Still another sensor senses abrupt light changes, so that approaching vehicle headlights trigger alarm function.

Thus has been broadly outlined the more important features of the improved animal repellent apparatus so that the detailed description thereof that follows may be better understood and in order that the present contribution to the art may be better appreciated.

An object of the animal repellent apparatus is to deter animals from roadway incursion.

Another object of the animal repellent apparatus is to substantially mimic the size and outward appearance of typical roadway reflectors.

A further object of the animal repellent apparatus is to be durable.

And, an object of the animal repellent apparatus is to be inexpensively produced and sold such that widespread roadway use is affordably possible.

Yet another object of the animal repellent apparatus is to negate the use complex electronic circuitry.

Additionally, an object of the animal repellent apparatus is to negate the use of any form of receiver within or in association with the apparatus.

Still another object of the animal repellent apparatus is to provide more than one embodiment, whereby choices between circuit complexities is provided.

And, an object of the animal repellent apparatus is to avoid tire damage.

These together with additional objects, features and advantages of the improved animal repellent apparatus will be readily apparent to those of ordinary skill in the art upon reading the following detailed description of presently preferred, but nonetheless illustrative, embodiments of the improved animal repellent apparatus when taken in conjunction with the accompanying drawings.

In this respect, before explaining the current embodiments of the improved animal repellent apparatus in detail, it is to be understood that the animal repellent apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved animal repellent apparatus. It is therefore important that the claims be regarded as including such equivalent constructions insofar as they do not depart from the spirit and scope of the animal repellent apparatus.

It is also to be understood that the phraseology and terminology employed herein are for purposes of description and should not be regarded as limiting.

DETAILED DESCRIPTION OF THE DRAWINGS

Figure 1:
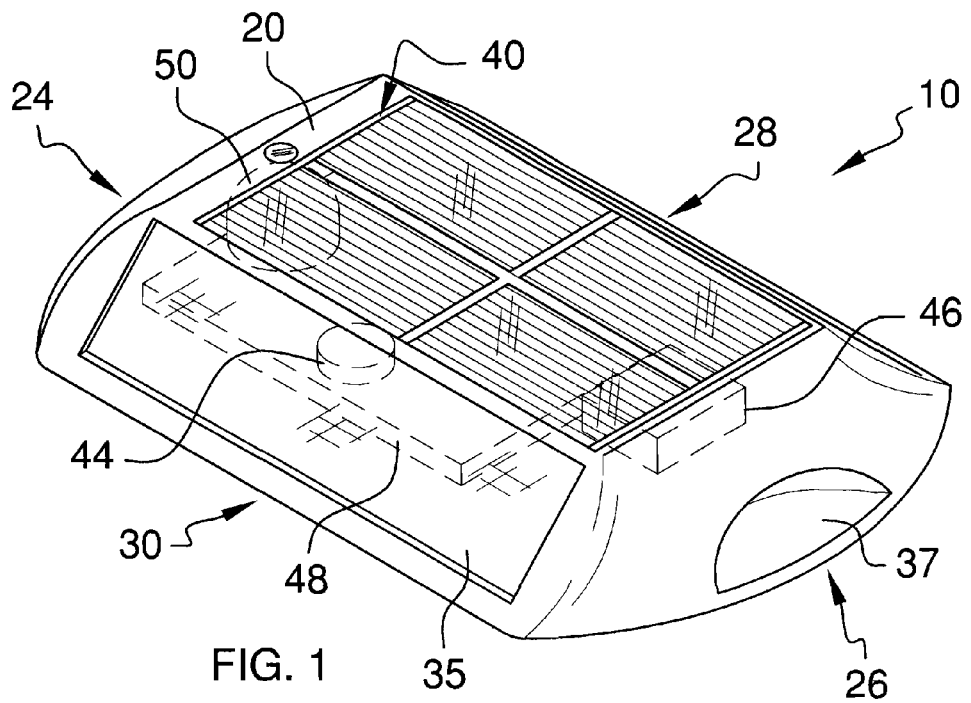
FIG. 1 is a perspective view of the most complete embodiment of the apparatus.

With reference now to the drawings, and in particular FIGS. 1 through 5 thereof, the principles and concepts of the animal repellent apparatus generally designated by the reference number 10 will be described.

Referring to FIGS. 1, 2, 3, and 5, the animal repellent apparatus 10 comprises a light transparent top 20 spaced apart from a bottom 22, first end 24 spaced apart from a second end 26, a first side 28 spaced apart from a second side 30. The interior 32 is disposed within the top 20, bottom, 22, ends, and sides. The interior 32 is provided in two embodiments.

The first interior 32 embodiment is solid, the apparatus 10 formed around the internal components illustrated. This solid interior 32 provides extreme durability. The second embodiment provides a hollow interior 32. The apparatus 10 externally substantially mimics an existing raised reflective pavement marker. A rounded top edge 21 is disposed between the top 20 and the ends. The rounded top edge 21 is further disposed between the top 20 and the sides. A rounded bottom edge 23 is disposed between the bottom 22 and the ends. The rounded bottom edge 23 is further disposed between the bottom 22 and the sides. A pair of identical mount indentions comprises the first mount indention 36 disposed within the first end 24 and the second mount indention 37 disposed within the second end 26. The mount indentions are important in providing for mounting the apparatus 10 to a roadway or marker or other object associated with roads. A common form of projectile mounting is via a gun that shoots mounting rivets, nails, screws, and other such mounting hardware into a particular mounting surface. The indentions provide that the apparatus 10 reflective and functional parts remain un-invaded by such mounting measures. The apparatus 10 may also be bonded to a surface from the bottom 22.

Figure 2:
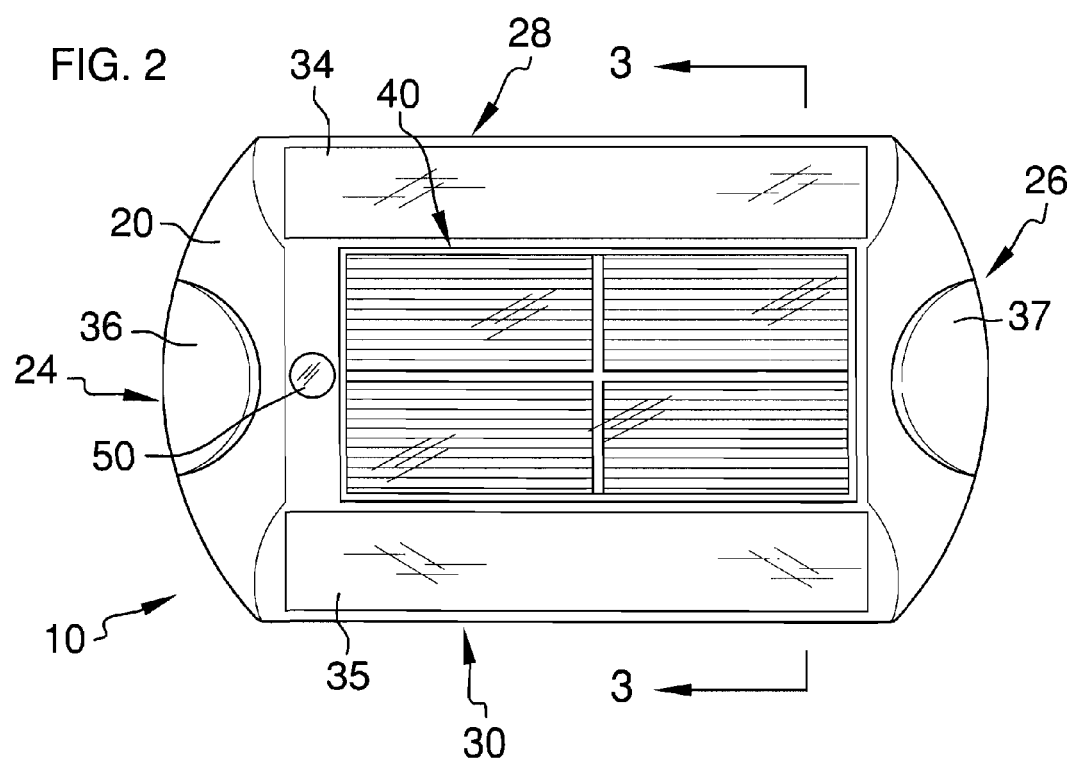
FIG. 2 is a top plan view.
Figure 3:
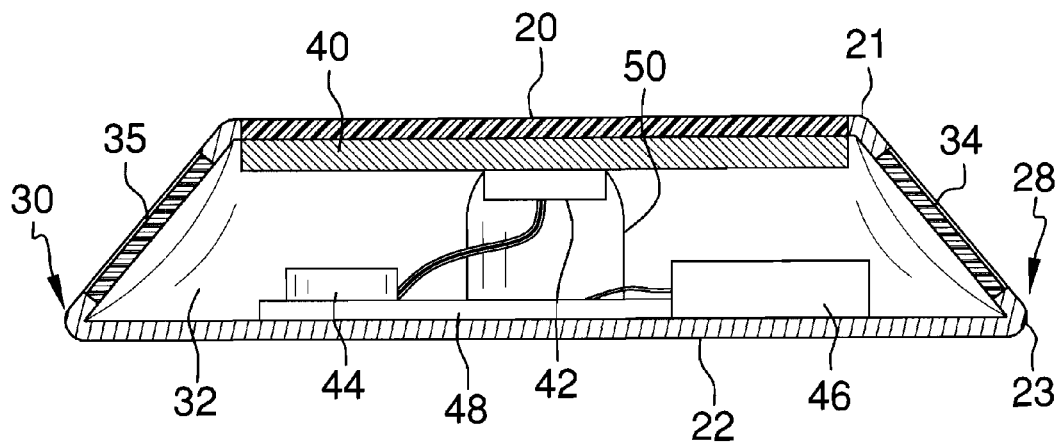
FIG. 3 is a cross sectional view of FIG. 2, taken along the line 3-3.
Figure 4:
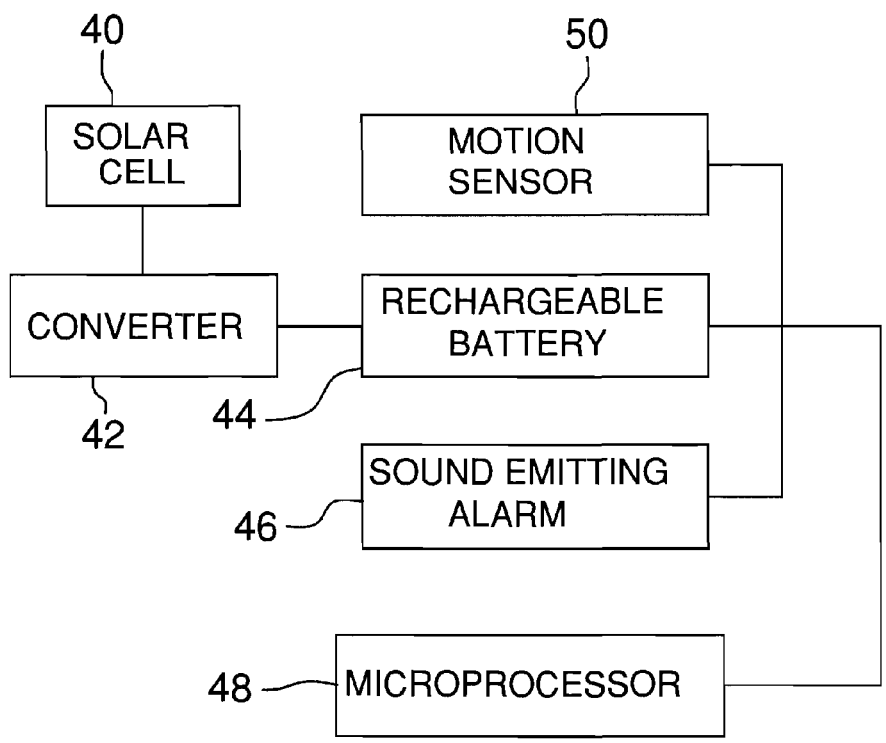
FIG. 4 is a schematic block diagram of the most complete embodiment of the apparatus.
Figure 5:
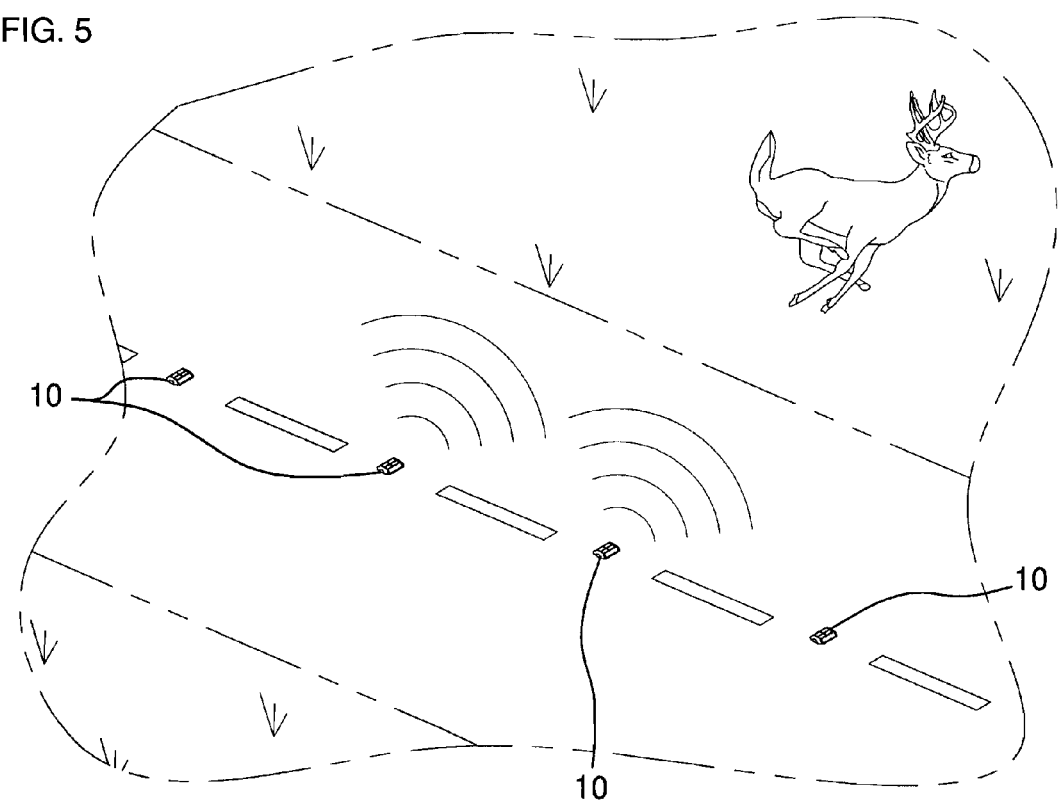
FIG. 5 is a perspective view of the apparatus in operation.

Referring further to FIGS. 1, 2, and 3, a solar panel 40 is disposed adjacent to the top 20. The converter 42 is affixed to the panel 40. The battery 44 is disposed within the interior 32. The battery 44 is in communication with the converter 42. The audio alarm 46 is disposed within the interior 32. In the most basic embodiment of the apparatus 10, the alarm 46 is in direct communication with the battery 44. The audio alarm 46 signals in an ultrasonic frequency.

The alarm 46 is optionally available in one that projects ultrasound intermittently. The pair of identical reflectors comprises the first reflector 34 disposed within the first side 28 and the second reflector 35 disposed within the second side 30.

Referring to FIG. 4 and again to FIG. 3, the most complete embodiment of the apparatus 10 comprises added features not present in the more basic embodiment. The motion sensor 50 and alarm 46 are both in communication with the battery 44. The microprocessor chip 48 is also in communication with the battery 44, the motion sensor 50, and the alarm 46. The alarm 46 does not sound until the motion sensor 50 detects a proximal position of an animal. Additionally, in an added embodiment, the motion sensor 50 is replaced by a light sensor (not shown) such that the alarm 46 does not sound without absence of light. Therefore, the alarm 46 sounds only at night. Additionally, a sensor is optionally installed within the apparatus 10 interior 32 that detects abrupt light changes so that the alarm 46 sounds with approaching headlights of a car, at night.

With respect to the above description then, it is to be realized that the optimum dimensional relationships for the parts of the animal repellent apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the animal repellent apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the animal repellent apparatus may be used.

Therefore, the foregoing is considered as illustrative only of the principles of the animal repellent apparatus. Further, since numerous modifications and changes will readily occur to those skilled in the art, it is not desired to limit the animal repellent apparatus to the exact construction and operation shown and described, and accordingly, all suitable modifications and equivalents may be resorted to, falling within the scope of the animal repellent apparatus.

What is claimed is:

1. An animal repellent apparatus, comprising, in combination:
    a light transparent top spaced apart from a bottom, a first end spaced apart from a second end; a first side spaced apart from a second side, a interior within, the apparatus externally substantially mimicking an existing raised reflective pavement marker;
    a rounded top edge disposed between the top and the ends, the rounded top edge further disposed between the top and the sides;
    a rounded bottom edge disposed between the bottom and the ends, the rounded bottom edge further disposed between the bottom and the sides;
    a pair of identical mount indentions comprising a first mount indention disposed within the first end, a second mount indention disposed within the second end;
    a solar panel disposed adjacent to the top, the panel within the interior;
    a converter affixed to the panel;
    a battery disposed within the interior, the battery in communication with the converter;
    a motion sensor disposed within the interior, the motion sensor in communication with the battery, wherein the motion sensor is configured to detect movement of an animal in proximity of the motion sensor;
    a microchip disposed within the interior, the microchip in communication with the motion sensor;
    an audio alarm disposed within the interior, the alarm in communication with the microchip, the audio alarm signaling in an ultrasonic frequency via direction from the microchip;
    a pair of identical reflectors comprising a first reflector disposed within the first side, a second reflector disposed within the second side.

2. The apparatus according to claim 1 wherein each reflector is further mounted externally within the sides.

* * * * *

UNITED STATES PATENT AND TRADEMARK OFFICE
CERTIFICATE OF CORRECTION

| | | |
|---|---|---|
| PATENT NO. | : 8,054,186 B1 | Page 1 of 1 |
| APPLICATION NO. | : 12/401019 | |
| DATED | : November 8, 2011 | |
| INVENTOR(S) | : Benjamin F. Ray and Sue B. Ray | |

It is certified that error appears in the above-identified patent and that said Letters Patent is hereby corrected as shown below:

On the Title Page:

Item (76) Inventors: Benjamin R. Ray should read Benjamin F. Ray

Signed and Sealed this
Twelfth Day of June, 2012

David J. Kappos
*Director of the United States Patent and Trademark Office*